US012280787B2

(12) United States Patent
Molloy et al.

(10) Patent No.: US 12,280,787 B2
(45) Date of Patent: Apr. 22, 2025

(54) APPARATUS FOR DETECTION OF DRIVER AND VEHICLE PERFORMANCE, FUEL EFFICIENCY AND PRESENCE OF HUMANS OR MAMMALS IN VEHICLE STORAGE AREA

(71) Applicants: Anthony John Molloy, Aldermaston (GB); Simon Giles, Aldermaston (GB)

(72) Inventors: Anthony John Molloy, Aldermaston (GB); Simon Giles, Aldermaston (GB)

( * ) Notice: Subject to any disclaimer, the term of this patent is extended or adjusted under 35 U.S.C. 154(b) by 249 days.

(21) Appl. No.: 17/773,638

(22) PCT Filed: Oct. 30, 2020

(86) PCT No.: PCT/GB2020/052747
§ 371 (c)(1),
(2) Date: May 2, 2022

(87) PCT Pub. No.: WO2021/084267
PCT Pub. Date: May 6, 2021

(65) Prior Publication Data
US 2022/0379899 A1    Dec. 1, 2022

(30) Foreign Application Priority Data
Oct. 30, 2019 (GB) ..................... 1915744

(51) Int. Cl.
*B60W 40/08* (2012.01)
*B60W 30/00* (2006.01)
*G07C 5/00* (2006.01)

(52) U.S. Cl.
CPC ............ *B60W 40/08* (2013.01); *B60W 30/00* (2013.01); *G07C 5/008* (2013.01); *B60W 2530/209* (2020.02)

(58) Field of Classification Search
None
See application file for complete search history.

(56) References Cited

U.S. PATENT DOCUMENTS

| | | | | |
|---|---|---|---|---|
| 7,103,460 | B1* | 9/2006 | Breed | G07C 5/008 706/15 |
| 7,386,372 | B2* | 6/2008 | Breed | B60R 21/01536 701/1 |
| 8,019,501 | B2* | 9/2011 | Breed | B62D 21/15 701/31.9 |
| 8,054,203 | B2* | 11/2011 | Breed | G06V 20/593 340/552 |
| 10,183,546 | B2* | 1/2019 | Whitens | G01J 5/0846 |
| 11,310,466 | B2* | 4/2022 | Amiram | H04N 23/57 |
| 2004/0100379 | A1 | 5/2004 | Boman et al. | |
| 2008/0036580 | A1 | 2/2008 | Breed | |
| 2020/0294401 | A1* | 9/2020 | Kerecsen | G08G 1/205 |
| 2023/0382392 | A1* | 11/2023 | Roberts | G07C 5/008 |

* cited by examiner

*Primary Examiner* — K. Wong
(74) *Attorney, Agent, or Firm* — GableGotwals

(57) ABSTRACT

The invention relates to the provision of apparatus and a method to determine the operation of a vehicle and provide monitoring of the same and the condition of a storage area capable of being transported as part of the vehicle. The storage area includes one or more detection devices provided in the same and which are in communication with the operator of the vehicle and/or external personnel or organisations so as to detect a change in condition of the vehicle and in particular if the change exceeds predetermined parameters.

23 Claims, 4 Drawing Sheets

Figure 1:
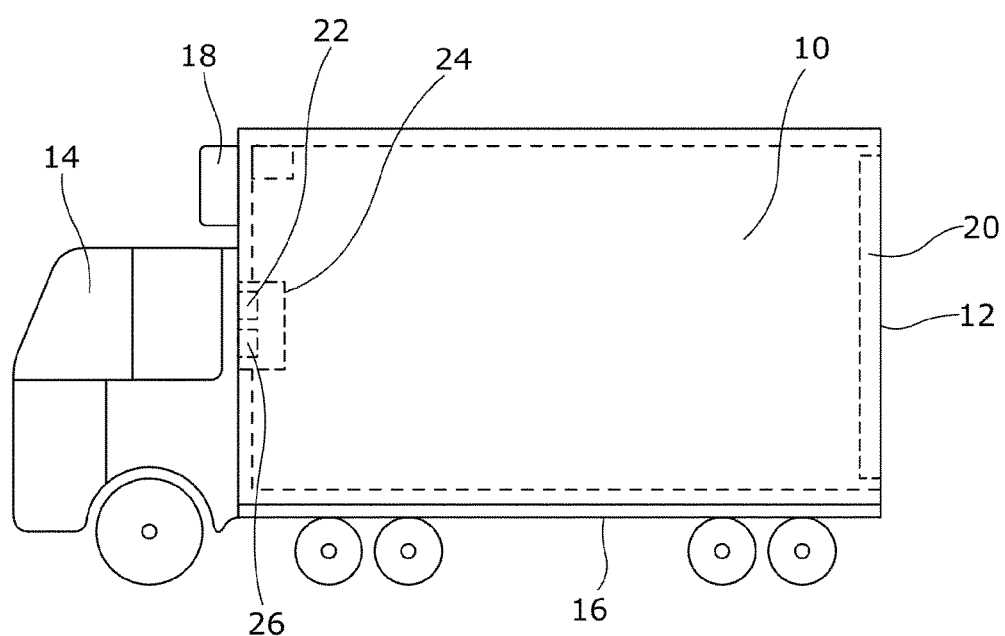

Fuel Rate delivered to give the Required Engine Torque, with Automatic gear changing Fuel Rate delivered to give the Required Engine Torque, with Manual gear changing

APPARATUS FOR DETECTION OF DRIVER AND VEHICLE PERFORMANCE, FUEL EFFICIENCY AND PRESENCE OF HUMANS OR MAMMALS IN VEHICLE STORAGE AREA

CROSS-REFERENCE TO RELATED APPLICATIONS

This United States application is the National Phase of PCT Application No. PCT/GB2020/052747 filed 30 Oct. 2020, which claims priority to British Patent Application No. GB1915744.5 filed 30 Oct. 2019, each of which is incorporated herein by reference.

There is currently wide spread knowledge and media coverage of criminal gangs operating in the process of illegal immigration and smuggling of humans and/or mammals across international borders.

It has been estimated that as many as 1.1 million people have entered into the UK illegally as border controls for entering the EU frontier and non-Shenghan zones (UK and Ireland) have proven to be ineffective at controlling the mass flow of illegal immigration.

Many illegal immigrants in the UK will have entered Europe via another country before making their way across the continent towards Britain. It is found that even if the persons are detected en-route, the immigration authorities who patrol Europes borders may do little more than question them before asking them to leave Europe voluntarily. Furthermore, it is well known that certain ports in the European Union are soft targets with poor border control and security. This allows many migrants to flow through these points of access; as such enabling the illegal immigrants to head towards and into other countries such as the UK A relatively high proportion of illegal immigrants attempt to stowaway in storage areas of vehicles and shipping containers carrying freight across the borders. In 2018 a total of 3,900 people were stopped at the ports trying to access the UK illegally.

To try and reduce the tide of illegal immigration, fines of £2k can be placed on the vehicle driver, for every stowaway that has been detected on the vehicle, as a deterrent. Tighter border controls have led to increased checks on vehicles entering the UK at Channel ports, which in turn has led to a surge in the number of illegal immigrants being picked up as they try to enter the UK. In 2008 border authorities intercepted nearly 20,000 illegal immigrants trying to enter the UK via Calais. However, it is impossible to say how many people still manage to enter the UK using this method and whether the increase simply reflects a rise in the total number trying to enter the UK.

Typically spot checks which are performed on vehicles at the border can occur and typically utilises either a sniffer dog, a heat radar sensor and/or a $CO_2$ probe that they place under the side curtain of the vehicles such as a trailer, or into a container to take $CO_2$ readings.

Heat radar systems are used to detect human body temperature of persons stowed on the vehicle; and to overcome this there has been a rise in persons stowing away in refrigerated vehicles, where temperatures can be as low as $-5°$ C. to $-25°$ C. This reduces the risk of detection by the border force with heat gun equipment but stowing away in cold refrigeration storage areas can lead to tragic consequences in the death of the persons in the storage area.

Dog and $CO_2$ probe spot checks are not uniform across all borders, meaning that lack of government spending in border security, has led to poor overall control over illegal immigration through these access points. It is possible to try and detect the presence of stowaways in vehicles, using video camera systems installed in the trailer, but these are limited as the vision system can be blocked by goods such as pallets of stock, stored in the trailer. Similarly, heat detectors can be avoided by persons being located at or adjacent to frozen goods.

The aim of the current invention is therefore to mitigate the technological flaws in other technology solutions and other such manual checks regarding stowaway detection on vehicles in real time.

In a first aspect of the invention there is provided apparatus for the detection of the presence of humans and/or animals in a vehicle storage area, said apparatus including a communication means to allow the transmission of data from one or more detection devices located within the said storage area, said detection devices including one, or a combination of, a device to detect current latitude, longitude and/or altitude of the device and hence storage area, a device to determine the vehicle speed and/or a device to measure carbon dioxide levels and/or air temperature in the said storage area and wherein monitoring means are provided to determine whether one or more of said detection devices are operating in a correct manner and/or providing data within predefined parameters.

In one embodiment there is provided a transmit-receiving pair communication between devices. Typically all of the abovementioned devices are provided.

In one embodiment a power source is provided to operate the said devices and said power source is an independent source of or is the vehicle battery source.

In one embodiment the detection means includes an Infra Red and/or pressure sensor and pump to detect if the Carbon Dioxide detection device is in contact with all of the air in the storage area and the open or closed status of one or more doors of the storage area.

In one embodiment one or more microprocessors are provided with embedded software, a storage memory and clock device, that can create and store records of date and time, current latitude and longitude, current velocity, current Carbon Dioxide level, current temperature, the sensory values relating to the communication of air in the enclosed space to the Carbon Dioxide sensor, along with the unique system ID.

In one embodiment a customer user interface is provided to allow automatic electronic alerts to drivers and/or border force protection units.

In a further aspect of the invention there is provided a vehicle with a storage area transported as part of the vehicle and wherein the vehicle includes communication means to allow the transmission of data from one or more detection devices located within the said storage area, said detection devices including at least one, or a combination of, a device to detect current latitude, longitude and/or altitude of the device and hence storage area, a device to determine the vehicle speed, a device to measure carbon dioxide levels and/or air temperature in the said storage area and wherein monitoring means are provided to determine whether one or more of said detection devices are operating in a correct manner and/or providing data within predefined parameters.

In one embodiment the vehicle operates by using information set which is sent and received from the central processing unit of the vehicle.

In one embodiment the vehicle operates by receiving data from the vehicles microprocessing unit.

In a further aspect of the invention there is provided a method of detecting a change in a parameter of a vehicle said method including detecting the latitude and longitude location of the vehicle and at least one parameter of a storage area provided with the vehicle and if the operating condition of the said at least one detection device provided to measure the at least one parameter, should change to be outside of predetermined operating parameters, generating an alert to the operator of the vehicle and/or external personnel or organisations.

In one embodiment the latitude and longitude position of the device via a satellite or micro gravitational techniques.

In one embodiment the connection of the detection devices and one or data processing means is via a serial line or pulse width modulation or changing current or voltage measurement, which monitors the state of the detection devices for bus arbitration on a command bus.

In one embodiment the apparatus and method allows the detection and transmission to a remote server via radio signal of the absence or malfunction of a detection device and in on embodiment a mini hub microcontroller is provided that is in communication with vehicle control processing unit via the CAN arbitration bus and in connection with the detection device microcontroller, that can respond to instructions from the main hub microcontroller via a serial communication system; the detection device microcontroller is receiving positive readings from attached CO2 and proximity detection devices.

In one embodiment the microcontroller creates records that are date and time stamped for measured values and these can be stored on a memory device that is in communication with it.

In one embodiment queued stored records on the attached memory device are transmitted to a remote server via a radio signal, with a transfer method of handshaking and data checksum methods. Successful uploaded records are then removed from the memory storage device to free up the memory on the storage device.

In one embodiment there is an initial installation calibration of a detection means in the form of proximity detection device that can determine the distance between the air vent in front of the IR sensor and the back door of the trailer or container, an initial measurement of the minimum $CO_2$ level at the start of the journey, i.e. at zero engine speed, and which is normally captured when the storage area is first opened, determined through the zero reading of the IR sensor; if an abnormal starting $CO_2$ is indicated an alert record is generated; an alert record is generated on $CO_2$ levels falling at altitude or location of the storage area, indicating a non hermetically sealed enclosure; an alert record is generated based on a positive vector increase in the $CO_2$ level reading, relative to the starting minimum reading given as a percentage increase; and an alert record is generated on a change in the proximity sensor distance to zero if the engine and vehicle speed is greater than zero, indicating vehicle is in motion, with the back door open or deliberate covering of the sensor enclosure vents has occurred.

In one embodiment there is provided a mathematical grouping that is used to calculate the moving average value of the received values over the entire data set.

In one embodiment a unique ID is stored along with the current date and time, the current latitude and longitude position, temperature, proximity sensor distance, current CO2 level, vehicle speed, engine speed using microprocessor clock components; to create a record and storing the record into a sequential memory location on the said main controller module memory device.

In one embodiment the method allows the reading of real time data from the vehicle CAN arbitration bus interface including any, or any combination, of total vehicle distance travelled; total vehicle fuel consumption and tank fuel level; fuel rate and fuel efficiency; engine speed and torque; pedal position; vehicle velocity; cruise control ON/OFF; engine % load at current velocity, vehicle weight; outside temperature and/or driving gear; In one embodiment in order to detect theft of fuel from a vehicle the method includes the steps of determining the positive difference in measurement of the current tank fuel level; taken when the engine speed changes from zero to a value above zero after a fixed time period; the determination of the latitude and longitude of the point of refuelling; the storing of a refuelling record with measured fuel volume, date and time and refuelling location; the transmission of the refuelling record through the use of radio communication signal.

In one embodiment in order to determine a driving performance, the method includes the steps of mathematically compressed and averaging data metrics and determining the latitude and longitude of the points of fixed distance and journey start and end locations and generating a performance record based on the mathematics and storing records and transmitting the generated records.

In one embodiment the transmitted records are displayed on a graphical user interface comprising of a server side processing algorithm to process and allocate incoming transmissions to customer accounts; a centralised remote database that stores all transmitted records for each unique vehicle ID; client side software that can connect to server side database to display real time data dynamically, reactive and in real time;

In one embodiment there is provided an alert system for drivers and/or security forces to alert them to a suspect storage area comprising a server side processing algorithm that processes incoming records; a transmission of an alert status via radio, telecoms or email messages; sent in real time to an associated account holder, driver or force email addresses or phone numbers and/or display alert transmissions directly to alert status LEDs, screens or audio messaging and the like inside the cabin of the vehicle at the point a alert status record is created based on sensor readings or absence of connected sensors In a further aspect of the invention there is provided a method to detect theft of fuel from a vehicle, the method including the steps of determining the positive difference in measurement of the current tank fuel level when the engine speed changes from zero to a value above zero after a fixed time period, the determination of the latitude and longitude of the location of refuelling the vehicle, the storing of a refuelling record with measured fuel volume, date and time and refuelling location, and the transmission of the refuelling record via a communication system to a control.

In one embodiment there is provided a method to detect fuel theft on the basis of a positive change in a detected change in tank fuel level and the latitude and longitude location and price of fuel at the filling station.

In one embodiment the method allows analysis of driving performance, based on fuel rate, fuel efficiency, engine speed, engine torque, vehicle velocity, pedal position, rate of change in accelerometer readings, mapped against the current operational gear, based on a percentile representation of values across the measured range.

The invention may be performed with vehicles which can be classed as domestic vehicles (Lutons, sprinters, transits etc), as these operate with a communication protocol ISO 14230 via OBD2 with an information set i.e. send and receive from the vehicle CPU, and vehicles which can be classed as commercial vehicles which receive data using the HGV protocol SAE J1979).

Preferably dual communication capability is provided for all vehicles.

Figure 2:
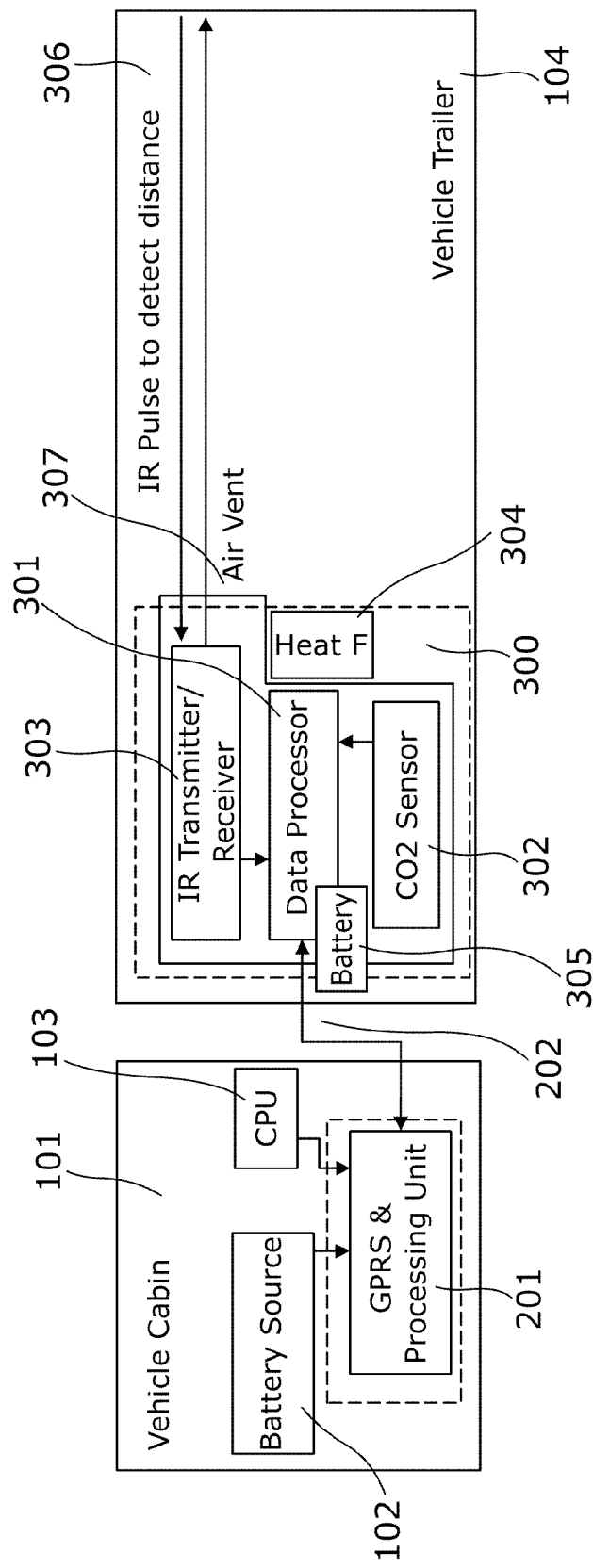
Figure 3A:
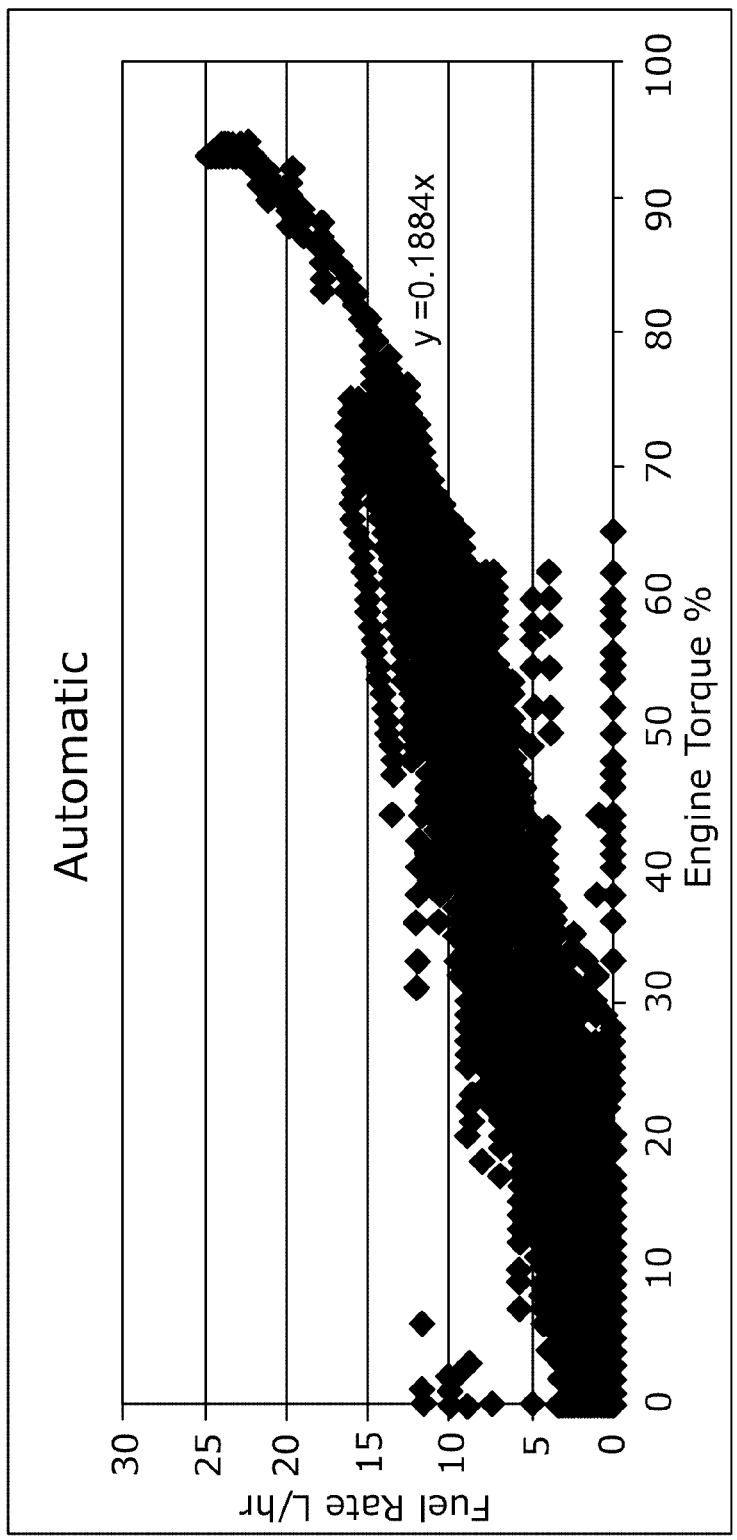

Specific embodiments of the invention are now described with reference to the accompanying Figures wherein FIG. 1 illustrates the interior of a vehicle storage area in accordance with one embodiment of the invention;

FIG. 2 illustrates a system in accordance with one embodiment of the invention in a schematic manner; and FIGS. 3a and b illustrate performance of one aspect of the invention.

FIG. 1 illustrates the interior 10 of a vehicle storage area 12 which typically can be attached to a vehicle tractor unit 14 or can be a container which is mounted on a bed 16 of the tractor unit for transport. In either case the storage area can be provided for the storage of goods in an ambient environment or, as in this embodiment, may be provided with refrigeration means 18 to allow a chilled or frozen environment to be provided in the storage area to allow certain goods to be transported in a chilled or frozen condition. The storage area includes access doors 20 and in accordance with the invention in the interior of the storage area there is provided at least a $CO_2$ detection device 22 mounted in a housing 24 with air vents to protect the same and allow the detection device to detect, in normal operation the level of $CO_2$ in the storage area. The storage area will have a "normal" level of the gas but if humans or animals are present the level of $CO_2$ will change and be detected by the detection device to thereby allow the unauthorised presence of the persons or animals to be detected. In addition there is provided an infra red detection means 26 which emits a beam into the storage area and typically towards the doors 20 and if the doors are open or the housing in which the $CO_2$ detection device is mounted are blocked to prevent the detection device from monitoring the level of the gas in the storage area then the infra red beam will be broken and an alert generated to the driver and/or security forces.

A human on average has a breathing cycle of around 3.75 seconds exhaling around 500 Litres of CO2 per day or 1 kg/day. In our test, one adult was placed inside a vehicle storage area in the form of a trailer (8 ft×8.5 ft×20 ft) with a volumetric area of 37.3 $m^3$ or 48.22 kg of air in the vehicle if empty (1 $m^3$ of air=1.293 kg). The largest change in CO2 level was recorded by the sensor in the first hour from a reading of 450 ppm to 1509 ppm. Over an eight hour period, the CO2 level had saturated at around 4,526 ppm.

As illustrated in FIG. 2 and in the tests real time changes in CO2 levels can be detected in the storage container, using a CO2 measurement device (302), as illustrated indicating the presence of living mammals and humans, from a non visionary approach.

In order for the CO2 sensor (302) to take the reading, it needs to be in contact with the air particles that move around the container though normal convection currents. An easy way of sabotaging the sensor would be to cover it with a sealed enclosure, with bonding or masking tape, as such the CO2 sensor (302) would read the level inside its own enclosure (300), but it will give a false reading, as it is being removed from the potential CO2 level inside the trailer or container (104).

The present invention solves this issue through the use of an Infra-Red (IR) proximity sensor (303) that is transmitting a coded IR signal (306) through the open air vent (307) and reflecting it back to determine the distance between the furthest point, normally the back door in the trailer (104) and the air vent (307) on the device housing (300) the CO2 sensor (302). This can also be achieved through the use of a 'Through IR transmitter and receiver pair'.

Should the vent (307) be deliberately covered or the back door opened, then the reflected distance of the signal changes, typically to give a zero value, alerting the driver and police in real time, if the vehicle is currently in motion, with the back door opened and or sensor is blocked, though auto electronic messaging alerts if this has happened.

Detecting if the vents (307) are blocked can also be detected through a measurement of current or voltage feeding an air pump inside the enclosure (or can also be achieved through a pressure sensor inside the enclosure.) If the vents are blocked, then the pressure, load and current on the pump will increase.

The installation of the IR beam (306) is to be set at the very top (roof) of the trailer, pointing at a reflective strip at the top centre point of the rear door, so that its IR path is not being impeded by normal vehicle loading.

Any other method such as radar or ultrasonic can be used to measure distance, but will not be effective as to detect if vents are blocked. This is because these types of signal will permeate through any blockages or the enclosure regardless.

Finally, a heating element (304) can be added to the enclosure to ensure that recording temperatures are above the minimum recording temperature of the CO2 sensor.

The nature of the installation is that it is fixed inside each and every storage area trailer (104). When attaching the container to the vehicle, it must then be plugged into the vehicle through the inter-car connecting harness (202). This delivers power to the battery (305) and sensor device (300) installed inside the trailer (104). The device will typically run on battery (305) when not in use, to detect any stowaways breaking in overnight when the vehicle is not in motion or connected. It is noted that the communication system can either be via a data cable (with power), IR, RF or radar/ultrasonic or other such methods.

Data processor (301) inside the sensor device (300), reads the values of the CO2, IR and pump current to measure guaranteed CO2 levels inside the trailer. Data is collected by the processor (301) and processed with Digital Signal Processing, through moving average measurements. Records are then generated and time stamped against the current date/time at points of incremental changes in measurement. These records are also stamped with the current GPS location of the measurement by GPS devices installed on either (201) or (301) and are stored on a memory device on PCB and processor (301).

Generated records are then sent to a remote server via the GPRS system. If no GPRS signal is present, then records are held on the memory device and are queued for sending until the GPRS signal is restored. GPS and GPRS signals are transmitted via an aerial stored internally, inside the enclosure (300) to prevent deliberate sabotage. Once records have been successfully received by the server, then are then deleted off the memory storage device on (301).

Device (300) will run off the supply power (if connected) to the device inside the cabin (101) through the use of connection harness (202) and recharge the battery (305). Alternatively, device (300) can be powered via a fixed power installation cable directly in the trailer or container (104).

Device (201) reads the data on the vehicles CAN bus using the SAE J1936 protocol. It constantly reads the data from the vehicle CPU (103). The purpose of this approach is so that it can detect the motion and velocity of the vehicle through the vehicle CPU (103). Device (200) can also detect if the harness and device (300) is connected and operational.

It is also noted that a possible independent device (300) can detect vehicle motion via the GPS device, without the need to connect to any other device. However, the important key to the link between device (200) inside the cabin (101) and the device (300) inside the trailer, through a harness connection, means that an interception of the trailer can occur via the vehicle registration plate. This is important, because trailers and containers are interchangeable.

In a second aspect of the invention, there is provided a method to prevent common fuel theft. Currently there are no methods or systems that can prevent a driver from part filling up their fuel tank and then subsequently filling up a second storage vessel, for their own personal use and then putting the total volume on their company fuel card.

Through the use of the CAN data bus on the vehicle, it is possible to detect the current fuel level inside the tank. Device (201) can then determine if there is an increase in fuel level when the vehicle is in a stationary position. If an increase in fuel level has been determined, then the total volume of fuel added into the tank and the GPS location is determined. From this location, it is possible to determine the fuel station being used and the current fuel price at that station. From this we can determine the expected value of the receipt submitted by the driver. Any value over the expected value can be then checked against fuel volume on the receipt and fuel theft can be determined.

Figure 3B:
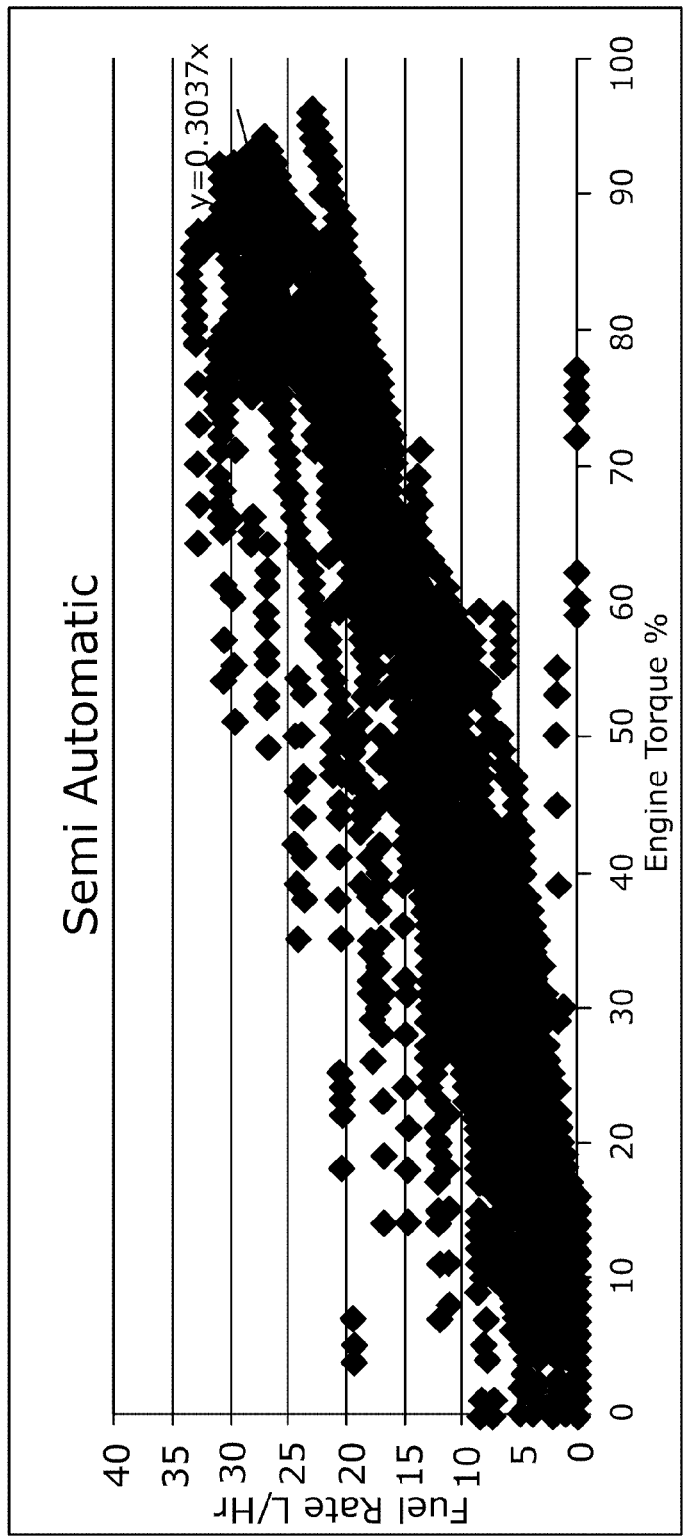

In a third aspect of the invention, is a method to determine the driver performance. It has been discovered that driver performance has a large impact on fuel consumption. We discovered that manual operation (Semi Automatic) gear changing on the vehicle uses 61% (see FIG. 3b) more fuel to power ratio, as compared to automated gear changing (see FIG. 3a).

The above test was concluded with a total of 178,000 data points for each of the two tests, with the same vehicle, on the same day, in the same outside conditions at a temperature of between: 16.5° C. and 19° C.

We also discovered that cruise control is good for giving low fuel rates, as it maintains a steady speed across long flat stretches of motorway. But this saving is lost if going uphill, as the engine torque increases to maintain cruise control speed. It is therefore advisable to switch off cruise control if driving in hill like terrain. The invention presented can determine if the vehicle is in cruise control via the CAN bus data and the GPS location. From this, it can be determined if the driver is driving most fuel efficiently.

Furthermore, it was determined that hard acceleration or driving at high revolutions in the current gear, leads to high torque and fuel demand from the engine. This driving condition is thus determined by analysis of the relationship of engine speed to current gear.

For high acceleration and braking (which is noted to wear tyres) is determined by a 3D gyroscope accelerometer on the device.

A relationship between pedal position and engine torque and fuel rate was also determined.

The data points measured by the vehicle CPU (103) are transmitted on the CAN bus at a transfer rate of between 0.1 Hz to 10 Hz. As such a method is required to use and compress the data being collected.

Here a mathematical method is applied to calculate the average parameter over tens of thousands of data points, without overloading the processor memory.

$$NAx = \frac{\left(\sum_{0}^{n} x\right)/n + CAx(b-1)}{b}$$

Where:
NAx is the new average value of the measured parameter calculated when the total of samples in the batch=the maximum sample size
CAx is the current average value of the parameter
x is the measured parameter value
b is the batch number of measured values
n is the maximum sample size Using all of the data points determined to have an effect on fuel consumption; these values are compressed and represented as total average values or as values in heat maps against current operating gear as a percentage percentile across the measured range. The heat map gives an indication of the normal distribution of the driving style throughout the journey.

Records are generated at points of fixed distances for the metrics discussed and for a total journey distance. From this the fuel consumption per mile can be determined for each driver, with key indicators in the data as to why. This can be extended to fuel brand as this is known via the GPS system and refuelling points with pricing. From this, the calorific value of the brands fuel can be quantified as miles per £ and be available to the driver.

The invention claimed is:

1. Apparatus for the detection of the presence of humans and/or animals in a vehicle having a vehicle storage area, the vehicle also including a cab in which a driver of the vehicle is located during movement of the vehicle; said apparatus comprising:
a communication means to allow transmission of data from one or more detection devices located within the vehicle storage area, said detection devices including,
a housing with vents including:
an infra-red detector, located within the housing, configured to detect an open or closed status of one or more doors into the vehicle storage area,
a carbon dioxide level detector, located in the housing, configured to detect, in normal operation, a level of $CO_2$ within the vehicle storage area and configured to detect a change in carbon dioxide level relative to a reference normal level and if a detected value is above the reference normal level, presence of the humans and/or animals in the vehicle storage area is determined to be unauthorized and, a detector configured to measure air temperature in the vehicle storage area,
a device configured to detect current latitude, longitude and/or altitude of the device and hence the vehicle storage area,
a device configured to determine a vehicle speed and
monitoring means are provided to determine whether the vents in the housing have been blocked to prevent said carbon dioxide level detector or the infra-red detector operating and/or providing data within predefined parameters.

2. Apparatus according to claim 1 wherein there is provided a transmit and/or receive communication between the said detecting devices and the monitoring means.

3. Apparatus according to claim 1 wherein a power source is provided to operate the said devices and said power source is an independent source and/or is the power supply for the vehicle.

4. Apparatus according to claim 1 wherein the detection devices further include a pressure sensor and pump to detect if the carbon dioxide detection device is in contact with all of the air in the storage area.

5. Apparatus according to claim 1 wherein one or more microprocessors are provided which include embedded software, a storage memory and a clock device to create and store records of data received from said detection devices.

6. Apparatus according to claim 5 wherein the data which is received includes date and time, latitude and/or longitude position of the vehicle storage area, vehicle velocity, carbon dioxide level, temperature, sensory values relating to the communication of air in the storage area and a unique system ID.

7. Apparatus according to claim 1 wherein a customer user interface is provided which creates an alert to a driver of the vehicle and/or external personnel when data which is outside of predefined parameters is received.

8. Apparatus according to claim 1 wherein the latitude and longitude position of the detection device is achieved via a satellite and/or micro-gravitational system.

9. Apparatus according to claim 1 wherein the connection of the detection devices and one or more data processing and monitoring means is via a serial line or pulse width modulation or changing current or voltage measurement to monitor the state of the detection devices for bus arbitration on a command bus.

10. Apparatus according to claim 1 wherein the apparatus allows the detection and transmission to a remote server wirelessly of the absence or malfunction of a detection device.

11. Apparatus according to claim 10 wherein a microcontroller is provided that is in communication with a vehicle control processing unit via a controller area network (CAN) arbitration bus and in connection with the detection device microcontrollers so as to respond to instructions from the main hub microcontroller via a serial communication means.

12. Apparatus according to claim 11 wherein the microcontroller creates data records that are date and time stamped for measured values and stored on the memory device that it is in communication with.

13. Apparatus according to claim 12 wherein queued stored records on the memory device are transmitted to a remote server via a wireless communication, with a transfer method of handshaking and data checks being used.

14. Apparatus according to claim 13 wherein successfully uploaded records are removed from the storage of the memory device.

15. Apparatus according to claim 1 wherein, initial installation calibration means are provided for at least some of the detection devices located in the vehicle storage area.

16. Apparatus according to claim 1 wherein unique I.D's are stored along with the current date and time, the current latitude and longitude position of the storage area, temperature, proximity sensor distance, current $CO_2$ level, vehicle speed, engine speed so as to create a data record and storing the record into a sequential memory location on the said memory device.

17. Apparatus according to claim 1 wherein the vehicle operates by using information which is sent and received from the central processing unit of the vehicle.

18. Apparatus according to claim 1 wherein the vehicle operates by receiving data from the vehicle's microprocessing unit.

19. A vehicle with a cab in which a driver of the vehicle is located during movement of the vehicle, said vehicle comprising:
a storage area having one or more doors transported as part of the vehicle, wherein the vehicle storage area includes apparatus for detection of a presence of humans and/or animals, said apparatus including:
an infra-red detector, located within a housing with air vents, configured to detect an open or closed status of the one or more vehicle storage area doors,
a carbon dioxide level detector located in the housing with air vents to protect the same, the carbon dioxide detector configured to detect, in normal operation, a level of $CO_2$ within the vehicle storage area and configured to detect a change in carbon dioxide level relative to a reference normal level and if the detected value is above the reference normal level, a presence of the humans and/or animals in the vehicle storage area is determined to be unauthorized, and
a detector configured to measure air temperature in the vehicle storage area,
a device configured to detect current latitude, longitude and/or altitude of the vehicle storage area,
a device configured to determine a speed of the vehicle, and
monitoring means configured to determine whether the vents in the housing have been blocked to prevent the carbon dioxide level detector or the infra-red detector operating and/or providing data within predefined parameters, and
a communication means to allow transmission of data from one or more of the detection devices located within the vehicle storage area.

20. A method of detecting an authorized presence of humans and/or animals in a storage area of a vehicle having one or more doors, the vehicle also including a cab in which a driver of the vehicle is present during movement of the vehicle, said method including:
providing a communication means configured to allow transmission of data from one or more detection devices located within the vehicle storage area,
detecting an open or closed status of the one or more doors by an infra-red detector located within a housing with air vents,
detecting a level of carbon dioxide in the vehicle storage area using a carbon dioxide level detector in the housing with air vents to protect the same and to allow the detector to detect, in normal operation, the level of $CO_2$ within the vehicle storage area and to detect a change in carbon dioxide level relative to a reference normal level and if the detected value is above the reference normal level, the presence of humans and/or animals in the vehicle storage area is determined to be unauthorized,
detecting air temperature in the vehicle storage area using a detector in the vehicle storage area,
detecting a current latitude, longitude and/or altitude location of the vehicle and hence vehicle storage area,
detecting a speed of the vehicle, and
providing monitoring means to determine whether the vents within the housing have been blocked to prevent the carbon dioxide detector operating and/or providing data within predefined parameters and if the condition of the detection devices change to be outside of predetermined operating parameters, generating an alert to the operator of the vehicle and/or external personnel or organisations.

21. A method according to claim 20 wherein the method includes the step of monitoring the level of fuel in the tank supply of the vehicle and the price of fuel in the vicinity of the detected location.

22. A method according to claim 21 wherein the method allows analysis of driving performance based on fuel rate, fuel efficiency, engine performance, vehicle velocity, foot pedal position, rate of change in accelerometer readings.

23. A method according to claim 20 wherein the method allows the reading of real time data from the vehicle controller area network (CAN) arbitration bus interface including any or any combination of total vehicle distance travel, total vehicle fuel consumption, tank fuel level, fuel rate, fuel efficiency, engine speed and torque, pedal position, vehicle velocity, cruise control, engine percentage load at current velocity, vehicle weight, outside temperature and/or driving gear.

\* \* \* \* \*